United States Patent
Cobb, III

(10) Patent No.: US 9,927,090 B2
(45) Date of Patent: Mar. 27, 2018

(54) PROFILE-SHAPED ARTICLES

(71) Applicant: John Clifton Cobb, III, Stoughton, MA (US)

(72) Inventor: John Clifton Cobb, III, Stoughton, MA (US)

(*) Notice: Subject to any disclaimer, the term of this patent is extended or adjusted under 35 U.S.C. 154(b) by 42 days.

(21) Appl. No.: 15/015,064

(22) Filed: Feb. 3, 2016

(65) Prior Publication Data

US 2016/0223156 A1   Aug. 4, 2016

Related U.S. Application Data

(60) Provisional application No. 62/111,656, filed on Feb. 3, 2015.

(51) Int. Cl.
| | |
|---|---|
| *F21V 11/00* | (2015.01) |
| *F21V 1/26* | (2006.01) |
| *B28B 1/00* | (2006.01) |
| *G06T 17/10* | (2006.01) |
| *B29C 64/00* | (2017.01) |

(52) U.S. Cl.
CPC ............ *F21V 1/26* (2013.01); *B28B 1/001* (2013.01); *B29C 64/00* (2017.08); *G06T 17/10* (2013.01)

(58) Field of Classification Search
CPC ....................................... G06T 15/00
USPC ............................................. 362/351
See application file for complete search history.

(56) References Cited

U.S. PATENT DOCUMENTS

| | | | | |
|---|---|---|---|---|
| 5,833,349 A | * | 11/1998 | Apple | F21K 2/00 362/311.04 |
| 2005/0053275 A1 | * | 3/2005 | Stokes | G06T 17/10 382/154 |
| 2013/0095302 A1 | * | 4/2013 | Pettis | B32B 3/10 428/195.1 |
| 2014/0046473 A1 | * | 2/2014 | Boynton | B29C 67/0088 700/119 |
| 2016/0163098 A1 | * | 6/2016 | Blanchflower | G06T 15/50 345/419 |

* cited by examiner

*Primary Examiner* — Seung Lee
(74) *Attorney, Agent, or Firm* — Timothy A. Welk, Esq.; Danielson Legal LLC

(57) ABSTRACT

Articles of manufacture and processes for generating articles of manufacture are disclosed. The articles of manufacture may serve as keepsakes and are shaped to include at least one three-dimensional representation of a subject, such as the subject's profile, that is obtained from a two-dimensional representation of the subject.

19 Claims, 8 Drawing Sheets

PROFILE-SHAPED ARTICLES

CROSS-REFERENCE TO RELATED APPLICATIONS

This application claims priority to and the benefit of U.S. Provisional Patent Application No. 62/111,656, filed on Feb. 3, 2015, which is hereby incorporated herein by reference in its entirety.

TECHNICAL FIELD

This invention generally relates to articles of manufacture, and more particularly, generating three-dimensional articles from two-dimensional profiles.

BACKGROUND

People are always looking for new and exciting ways of creating keepsakes, such as keepsakes of their loved ones. For example, people often keep photographs of their loved ones in wallets, purses, or in their homes or work environments. However, these conventional keepsake configurations such as photographs, scrapbooks, etc., do not offer functional keepsakes for daily use.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one aspect, embodiments of the present invention relate to a process for generating an article of manufacture from a two-dimensional representation of a subject, the process comprising: extracting a profile of the subject from the two-dimensional representation; projecting the profile of the subject through three dimensions to create a three-dimensional form of the subject; and manufacturing at least one three-dimensional representation of the subject based on the three-dimensional form of the subject.

In one embodiment of the process, the process further comprises affixing at least one of the at least one three-dimensional representation of the subject to a fixture with a light source so that the light source illuminates the affixed three-dimensional representation of the subject.

In one embodiment of the process, the two-dimensional representation of the subject is selected from one or more of a silhouette or an image of the subject.

In one embodiment of the process, identifying the profile of the subject includes identifying the profile of the subject autonomously using an automated application.

In one embodiment of the process, manufacturing the at least one three-dimensional representation of the subject includes manufacturing the at least one three-dimensional representation of the subject as one or more of a lamp shade, drinkware, dishware, utensils, furniture, décor, clothing, jewelry, or a tool.

In one embodiment of the process, projecting the profile of the subject through three dimensions includes rotating the profile about an axis.

In one embodiment of the process, the three-dimensional form of the subject is a three-dimensional shell with an aperture to accommodate a light source.

In one embodiment of the process, the subject is a person. In this embodiment, the profile is a profile of the person's facial features.

In one embodiment of the process, the article of manufacture comprises a plurality of three-dimensional representations, and the profile of the subject is divided over the plurality of three-dimensional representations.

In one embodiment of the process, the process further includes extracting a second profile of another subject from a two-dimensional representation, projecting the second profile through three dimensions to create an interim three-dimensional form, and combining the three-dimensional form of the subject with the interim three-dimensional form and using the resulting combination to manufacture the at least one three-dimensional representation.

In another aspect, embodiments of the present invention relate to at least one article of manufacture formed by the aforementioned process.

In one embodiment of the at least one article of manufacture, the article of manufacture is a light shade that is affixed to a fixture with a light source so that the light source illuminates the affixed three dimensional representation of the subject.

In one embodiment of the at least one article of manufacture, the article of manufacture is one or more of a lamp shade, drinkware, dishware, utensils, furniture, décor, clothing, jewelry, or a tool.

In one embodiment of the at least one article of manufacture, the subject is a person. In this embodiment, the profile is a profile of the person's facial features.

In one embodiment of the at least one article of manufacture, the article of manufacture is shaped as a three-dimensional shell with an aperture to accommodate a light source.

In one embodiment of the at least one article of manufacture, the article of manufacture is formed from a phosphorescent material.

In one embodiment of the at least one article of manufacture, the article of manufacture is shaped to include a plurality of three-dimensional representations, and the profile of the subject is divided over the plurality of three-dimensional representations.

In yet another aspect, embodiments of the present invention relate to a light source cover, the cover comprising: an interior surface configured to face a light source; and an exterior surface that is shaped as a three-dimensional representation of a two-dimensional profile, wherein the light source cover is configured to be affixed to a fixture with a light source so that the light source illuminates the light source cover.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
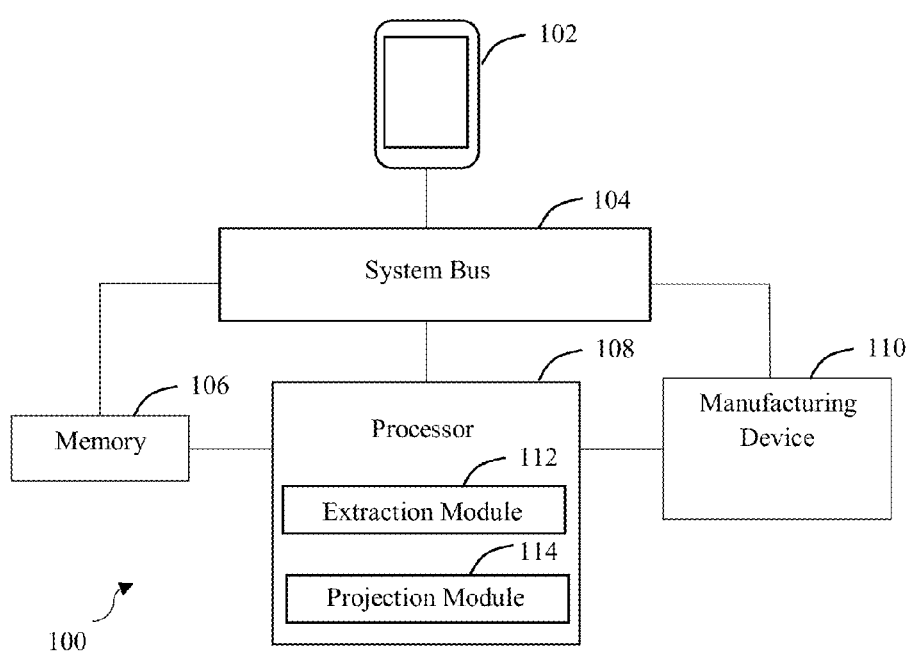
FIG. 1 schematically illustrates components used to generate an article of manufacture in accordance with one embodiment of the invention.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

In the context of the present application, the term "profile" refers to an outline of a subject, such as a person's facial features. The term "form" refers to a projection of the profile through three dimensions, such as through a CAD application or algorithm. The term "three-dimensional representation" refers to a manufactured, tangible object that is shaped to include at least a portion of at least one profile (or a negative thereof). The term "article of manufacture" refers to an end product that may include one or more representations.

FIG. 1 schematically illustrates components of a system 100 used to generate an article of manufacture in accordance with the features of the invention. These components may include a user interface 102, a system bus 104, memory 106, a processor 108 and a manufacturing device 110. The processor may include an extraction module 112 and a projection module 114.

The user interface 102 may be a laptop, tablet, desktop or mobile computer, and may enable an operator to control the various devices of the system 100 and receive feedback therefrom. The system bus 104 may enable information to be transferred among the various devices of the system 100. The memory 106 may store computer readable instructions to be implemented by the various devices and store information relating to two-dimensional representations of subjects and their forms, for example. The processor 108 may include the extraction module 112 and the projection module 114 to perform extraction and projection steps, respectively, on the profile of the two-dimensional representation of the subject. The processor 108 may be operably connected to the manufacturing device 110 to manufacture the three-dimensional representation based on the output from the projection module 114.

Figure 2:
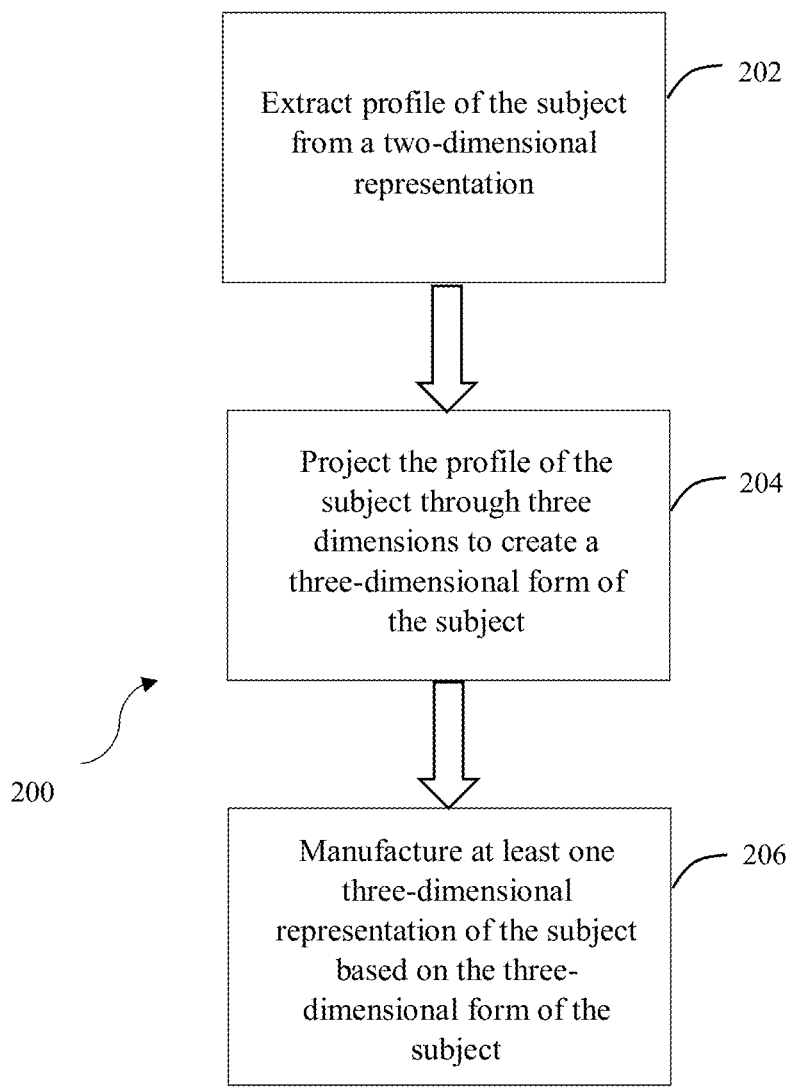
FIG. 2 depicts a flowchart of a process of generating an article of manufacture in accordance with one embodiment of the invention.

FIG. 2 depicts a flowchart of a process 200 for generating an article of manufacture from a two-dimensional representation of a subject in accordance with one embodiment of the invention. Process 200 may be performed using the components of FIG. 1, for example. The process 200 is described as generating a lamp shade keepsake that is shaped as a three-dimensional representation of a subject's profile (in this case, the subject is a person). However, this process 200 may be performed to generate a wide variety of articles.

Step 202 involves extracting a profile of the subject from the two-dimensional representation of the subject. The two-dimensional representation may be an image such as a picture or a frame of a video. The two-dimensional representation may be in color or black and white, a silhouette, or the like.

Figure 3:
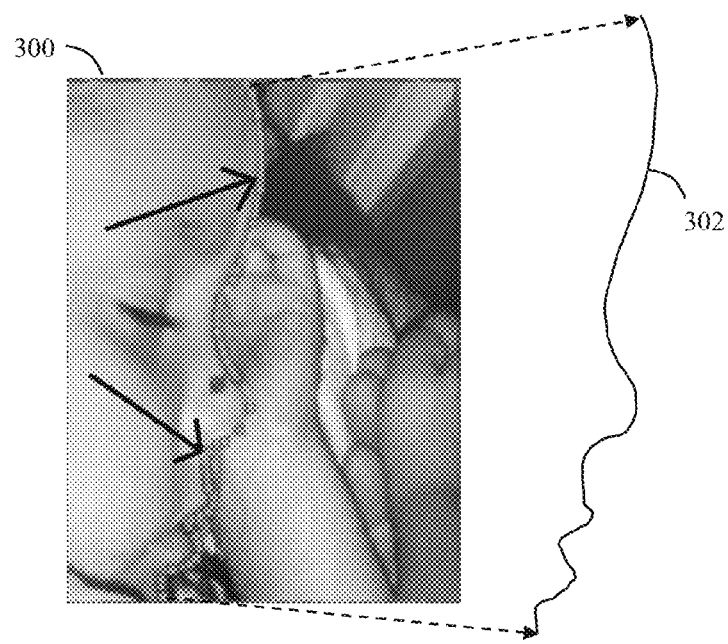
FIG. 3 depicts a photograph of a person whose profile is to be extracted in accordance with one embodiment of the invention.

FIG. 3 depicts a photograph 300 of the person (a young child) whose profile is to be extracted by the extraction module 112. As can be seen in FIG. 3, the person's profile 302 (i.e., the child's facial features) is identified by indicia in the form of a line connecting a plurality of points.

The profile 302 may be identified manually, in which case an operator may use a computer-aided drawing (CAD) application to identify and label points in the photograph 300 that correspond to the person's profile 302. Alternatively, the extraction module 112 may use any suitable computer vision technique to autonomously extract the person's profile 302.

It is of course noted that the term "profile" as used in this application is not limited to facial features. Rather, any type of profile, silhouette or shape, etc. of a subject may be used to create an article.

Returning to FIG. 2, step 204 involves projecting the profile 302 of the subject through three dimensions to create a three-dimensional form of the subject for the generation of the article. The type of projection may of course depend on the intended use or function of the finished article. The projection module 114 may use any suitable application or algorithm (rotation, extrusion, etc.) to project the profile 302 through three dimensions.

Figure 4:
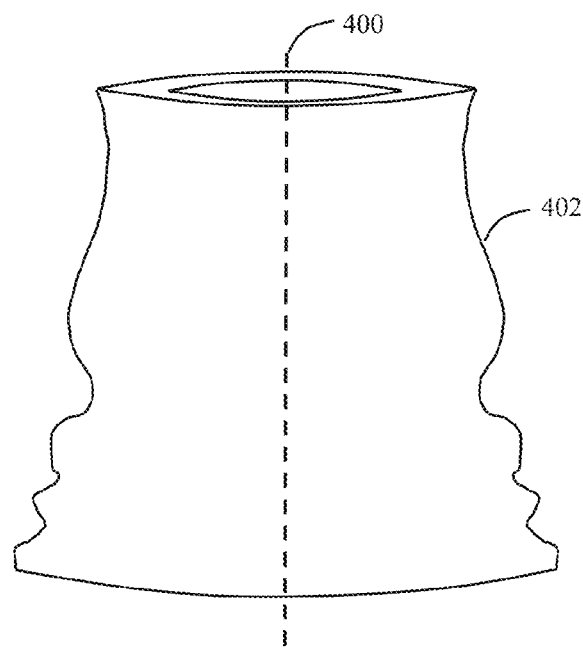
FIG. 4 illustrates the extracted profile of FIG. 3 having undergone a projection in accordance with one embodiment of the invention.

FIG. 4 illustrates the profile 302 of FIG. 3 having undergone a rotation projection about axis 400 to create a three-dimensional form 402. The projection module 114 may use any suitable application or algorithm to project the profile 302. As the finished article in this embodiment will be a lamp shade, an aperture may manually or automatically be added to accommodate a light source.

As can be seen, the exterior surface of the form 402 is in the negative shape of the profile 302 of FIG. 3. In other words, the shape of the exterior surface is such that the person's facial features can be seen in the negative space surrounding the form 402.

In other embodiments, the projection of step 204 may be an extrusion in which a profile can be projected to create on subject of a certain length. For example, picture frames, shelving units, table edges, and other substantially straight items may be shaped to include a profile such as the profile 302 (or a negative thereof) of FIG. 3.

Returning to FIG. 2, step 206 involves manufacturing a three-dimensional representation of the subject based on the three-dimensional form of the subject. This step may be completed by using any manufacturing technique such as, but not limited to, injection molding, casting, forging, joining, additive manufacturing and other various forms of "3D printing" (e.g., sintering), or the like. The manufacturing technique used, as well as the material used, may vary and may depend on the function of the article.

Figure 5:
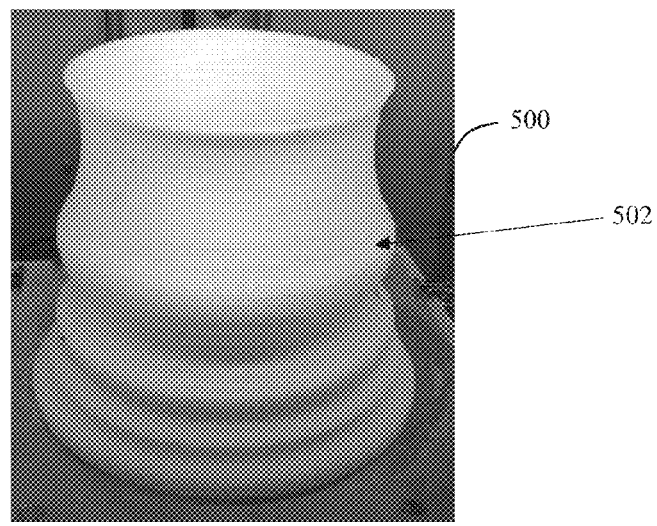
FIG. 5 depicts a photograph of a manufactured keepsake in the form of a lamp shade in accordance with one embodiment of the invention.

FIG. 5 depicts a photograph 500 of a manufactured article shaped as a lamp shade 502. As can be seen, the shape of the exterior of the lamp shade 502 represents the negative of the profile 302 of FIG. 3 such that the person's profile can be seen in the negative space surrounding the lamp shade 502.

Figure 6:
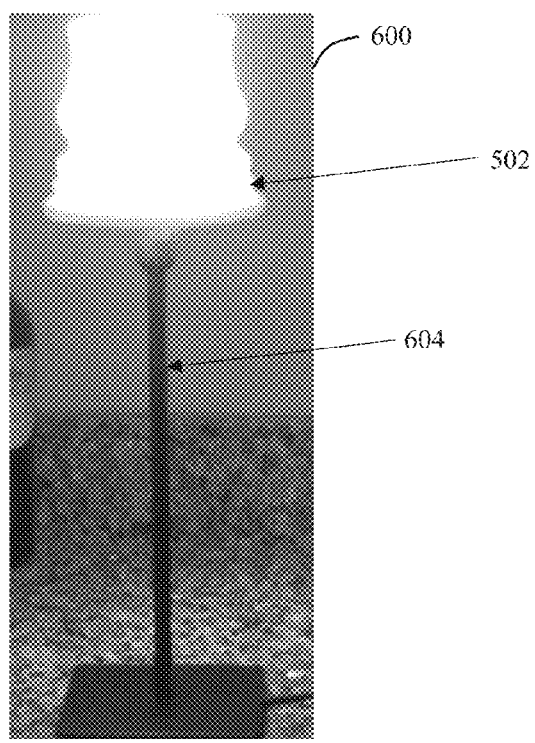
FIG. 6 depicts a photograph of the manufactured keepsake of FIG. 5 affixed to a light fixture in accordance with one embodiment of the invention.

FIG. 6 depicts the lamp shade 502 of FIG. 5 affixed to a fixture 600 with a light source (not shown). A light source may illuminate the lamp shade 502 and therefore the profile can easily be seen in the negative space surrounding the lamp shade 502. The lamp shade 502 may also be made of a phosphorescent (i.e., a "glow-in-the-dark") material so the profile can be seen even after the light source is turned off.

The features of the present invention are obviously not limited to lamp shades. Rather, the features of the present invention may be used to generate a wide variety of manufactured articles. FIGS. 7A-E illustrate several exemplary articles that may be generated in accordance with the features of the invention. For example, the table of FIG. 7A (as well as a desk, a shelving unit, or the like) may include a profile along its side(s).

Figure 7A:
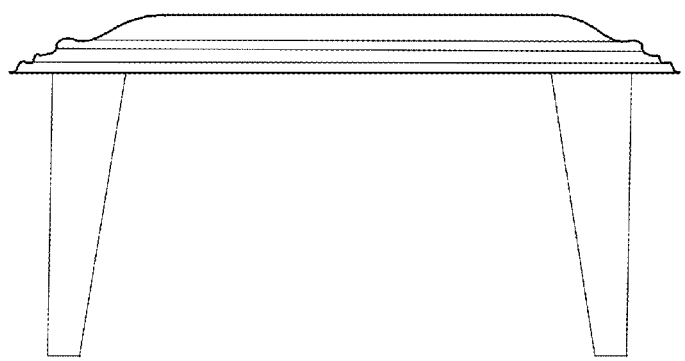
FIGS. 7A-E generally illustrate several exemplary articles in accordance with various embodiments of the invention.
Figure 7B:
Figure 7C:
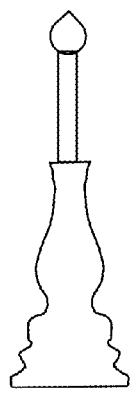
Figure 7D:
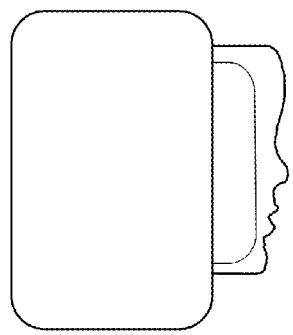
Figure 7E:
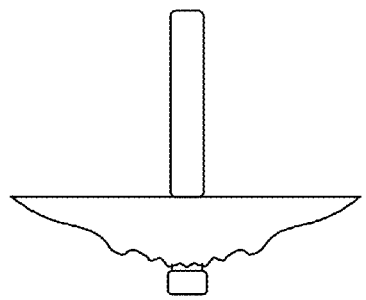

Other articles that can include a representation of a subject's profile include jewelry such as the earring of FIG. 7B, décor such as the candlestick of FIG. 7C, dish or drinkware such as the mug of FIG. 7D, and tools such as a router bit device of FIG. 7E. The router bit device of FIG. 7E may in turn allow a user to carve or otherwise imprint a profile (or a negative thereof) into any suitable article. These are merely examples, and it is contemplated that the features of the invention may be used to include representations of profiles in several other, additional types of articles.

As discussed above, articles can include representations of profiles in a negative configuration (concave) or a positive configuration (convex). For example, the lamp shade 502 of FIGS. 5 and 6 includes a representation of the subject's profile in a negative (concave) configuration. That is, the lamp shade 502 itself is not in the shape of the subject's profile, but the profile can be seen in the negative space surrounding the lamp shade 502.

FIGS. 7A, 7B, 7D, and 7E, on the other hand, include representations of the subject's profile in a positive (convex) configuration. That is, the articles of FIGS. 7A, 7B, 7D, and 7E each include representations in the shape of the subject's profile. Although the router bit device of FIG. 7E includes a representation of the subject's profile in a positive configuration, it will carve the shape of the profile into an article such that the article includes a representation of the profile in a negative (concave) configuration. Whether a representation of a profile is in a positive or negative configuration may depend on the subject, the profile, the type manufacturing process used, the type of article, and the material of the article, among other factors.

Similarly, articles may be generated in a set, in which one article may include a representation of the subject's profile in a positive configuration, and another article may include a representation of the subject's profile in a negative configuration.

Figure 8:
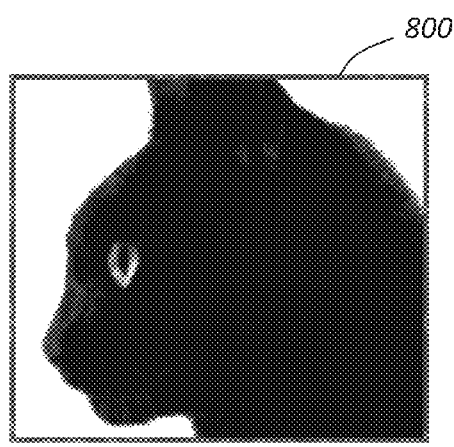
FIG. 8 depicts a photograph of a cat whose profile is used to generate articles of manufacture in accordance with another embodiment of the invention.
Figure 9A:
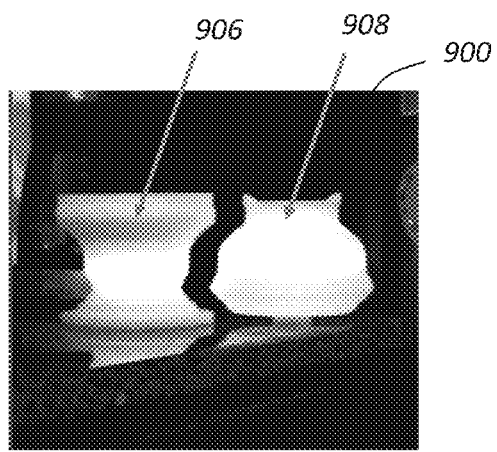
FIGS. 9A-C depict photographs of articles shaped to include representations of profiles derived from the photograph of FIG. 8 in accordance with another embodiment of the invention.
Figure 9B:
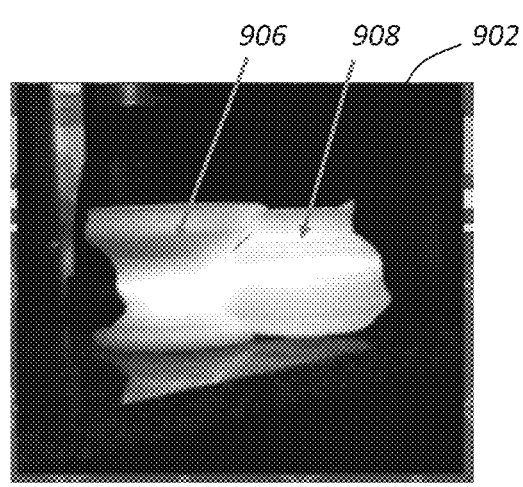
Figure 9C:
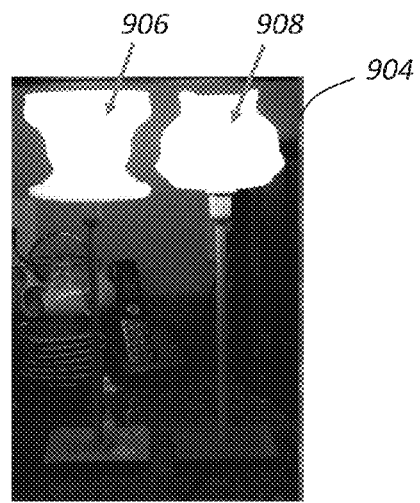

FIG. 8 depicts a photograph 800 of a cat whose profile is used to generate multiple articles in accordance with the features of the invention. Specifically, the cat's profile will be used to generate two lampshades. FIGS. 9A, 9B, and 9C each depict photographs 900, 902, and 904, respectively, of two lampshades; lampshade 906 includes a representation of the cat's profile in a negative configuration, and lampshade 908 includes a representation of the cat's profile in a positive configuration. It follows that, and as seen in FIG. 9B, lampshades 906 and 908 fit together. FIG. 9C depicts the lampshades 906 and 908 affixed to fixtures. A light source may illuminate the lamp shades 906 and 908 so that the representations (positive and negative) of the profiles can easily be seen.

Figure 10A:
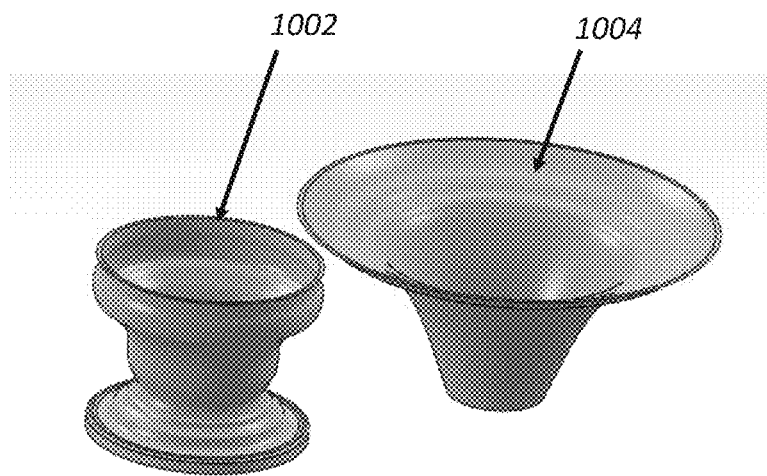
FIGS. 10A-B illustrate three-dimensional forms of a profile derived from the photograph of FIG. 8 in accordance with another embodiment of the invention.
Figure 10B:
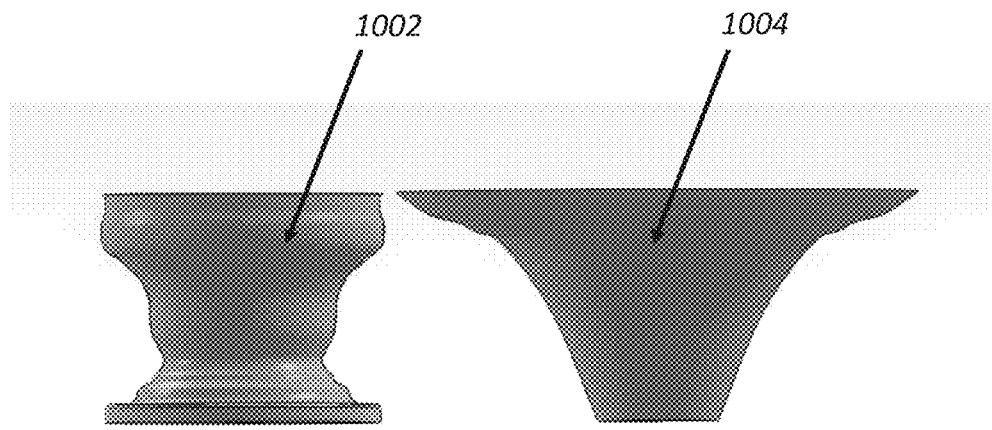

In other embodiments, the subject's profile may be divided over more than one representation. For example, FIGS. 10A and 10B illustrate three-dimensional forms 1002 and 1004 (e.g., lampshades before they are manufactured). FIG. 10B illustrates that the forms 1002 and 1004 are shaped such that they (once manufactured) will fit together to represent the profile of the cat of FIG. 8.

It is also noted that a single article may include more than one representation, each representation derived from its own profile. For example, a single article may be shaped to include two three-dimensional representations to reflect multiple subjects' profiles. Or, an article may be shaped to include multiple representations of the same subject (e.g., a person's profile at various ages of their life).

Figure 11:
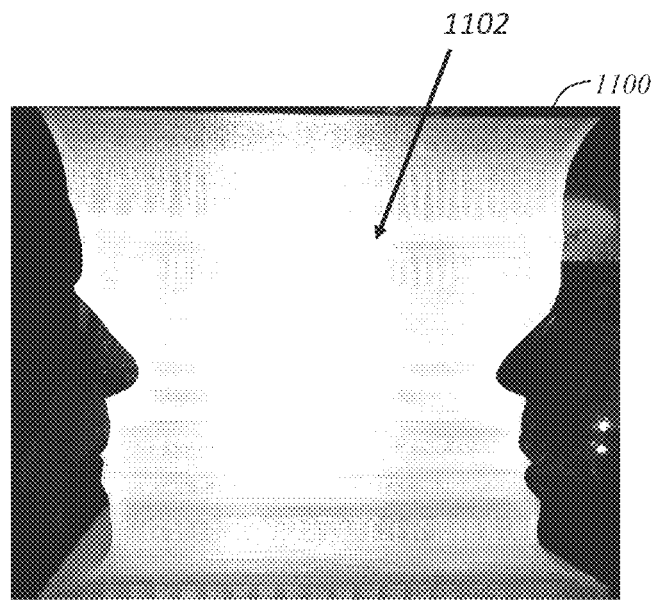
FIG. 11 depicts a photograph of an article shaped to include multiple three-dimensional representations in accordance with yet another embodiment of the invention.

FIG. 11, for example, depicts a photograph 1100 of an article 1102 (e.g., a lampshade) that has been shaped to include two three-dimensional representations to reflect profiles of two people. The profile of a first person is seen on the left side of the article (in a negative configuration), and the profile of a second person is seen on the right side of the article (also in a negative configuration). It is also contemplated that a generated article may be shaped to include representations of more than two subjects, as well as representations of both a person and an animal (e.g., the person's pet).

The article 1102 of FIG. 11 may be generated by first aligning a central feature of each subject (e.g., the nose of each subject, as if the subjects' were facing each other). This may be done by placing two separate photographs of the subject(s) next to each other, or a single photograph of two subjects facing each other. The profiles may be identified and extracted by any of the methods discussed above.

Then, the profiles may be projected on multiple planes that intersect the same axis. This creates an interim three-dimensional form with different facets around the form that are fused or otherwise blended with each other when the forms are combined. Once the corresponding three-dimensional representation is manufactured, this creates a "self-morphing" illusion as the article is rotated or if a person were to walk around the article.

Figures 12A, 12B:
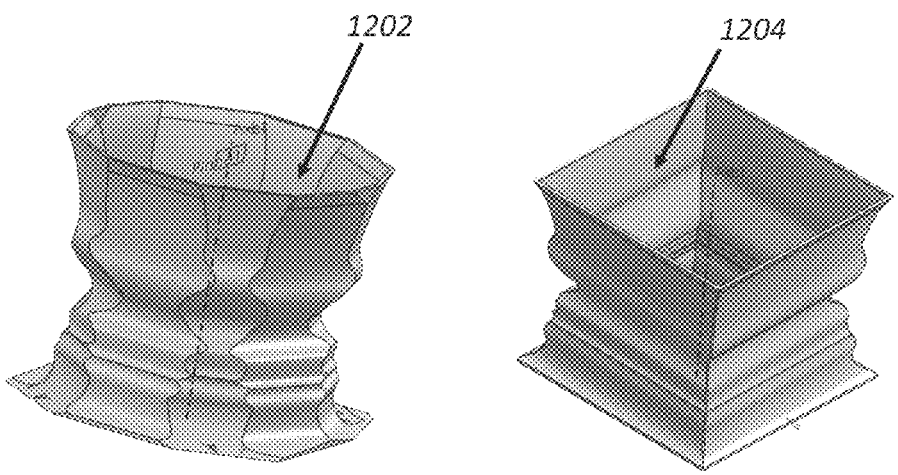
FIGS. 12A-B illustrate three-dimensional forms that are each shaped to include multiple profiles in accordance with one embodiment of the invention.

FIGS. 12A and 12B illustrate exemplary three-dimensional forms 1202 and 1204 that may be used to generate articles such as the article 1102 of FIG. 11. Facet lines (e.g., edges) can be seen vertically in the illustrations of FIGS. 12A and 12B. The sharper these lines, the more drastic or "fast" the morphing between forms appears to occur. These transitions can be edited through a CAD application or algorithm to make a more gradual visual transformation.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A process for generating an article of manufacture from a single two-dimensional photograph of a subject, the process comprising:
   extracting a linear profile of the subject from the single two-dimensional photograph;
   projecting the linear profile of the subject through three dimensions to create a three-dimensional form of the subject; and
   manufacturing at least one three-dimensional representation of the subject based on the three-dimensional form of the subject.

2. The process of claim 1, further comprising affixing at least one of the at least one three-dimensional representation of the subject to a fixture with a light source so that the light source illuminates the affixed three-dimensional representation of the subject.

3. The process of claim 1, wherein the single two-dimensional photograph of the subject is a silhouette of the subject.

4. The process of claim 1, wherein identifying the profile of the subject includes identifying the profile of the subject autonomously using an automated application.

5. The process of claim 1, wherein manufacturing the at least one three-dimensional representation of the subject includes manufacturing the at least one three-dimensional representation of the subject as one or more of a lamp shade, drinkware, dishware, utensils, furniture, décor, clothing, jewelry, or a tool.

6. The process of claim 1, wherein projecting the linear profile of the subject through three dimensions includes rotating the profile about an axis.

7. The process of claim 1, wherein the three-dimensional form of the subject is a three-dimensional shell with an aperture to accommodate a light source.

8. The process of claim 1, wherein the subject is a person.

9. The process of claim 8, wherein the linear profile is a profile of the person's facial features.

10. The process of claim 1, wherein the article of manufacture comprises a plurality of three-dimensional representations, and the profile of the subject is divided over the plurality of three-dimensional representations.

11. The process of claim 1, further comprising:
    extracting a second profile of another subject from a two-dimensional representation;
    projecting the second profile through three dimensions to create an interim three-dimensional form; and
    combining the three-dimensional form of the subject with the interim three-dimensional form and using the resulting combination to manufacture the at least one three-dimensional representation.

12. At least one article of manufacture formed by the process of claim 1.

13. The at least one article of manufacture of claim 12, wherein the article of manufacture is a light shade that is affixed to a fixture with a light source so that the light source illuminates the affixed three dimensional representation of the subject.

14. The at least one article of manufacture of claim 12, wherein the article of manufacture is one or more of a lamp shade, drinkware, dishware, utensils, furniture, décor, clothing, jewelry, or a tool.

15. The at least one article of manufacture of claim 12, wherein the subject is a person.

16. The at least one article of manufacture of claim 15, wherein the profile is a profile of the person's facial features.

17. The at least one article of manufacture of claim 12, wherein the article of manufacture is shaped as a three-dimensional shell with an aperture to accommodate a light source.

18. The at least one article of manufacture of claim 12, wherein the article of manufacture is formed from a phosphorescent material.

19. The at least one article of manufacture of claim 12, wherein the article of manufacture is shaped to include a plurality of three-dimensional representations, and the profile of the subject is divided over the plurality of three-dimensional representations.

* * * * *